(12) United States Patent
Maennel

(10) Patent No.: US 9,159,030 B1
(45) Date of Patent: Oct. 13, 2015

(54) REFINING LOCATION DETECTION FROM A QUERY STREAM

(71) Applicant: GOOGLE INC., Mountain View, CA (US)

(72) Inventor: Hartmut Maennel, Zurich (CH)

(73) Assignee: Google Inc., Mountain View, CA (US)

( * ) Notice: Subject to any disclaimer, the term of this patent is extended or adjusted under 35 U.S.C. 154(b) by 335 days.

(21) Appl. No.: 13/829,248

(22) Filed: Mar. 14, 2013

(51) Int. Cl.
G06N 5/04 (2006.01)

(52) U.S. Cl.
CPC ..................... *G06N 5/048* (2013.01)

(58) Field of Classification Search
CPC ....................................... G06N 5/022
USPC .......................................... 706/52
See application file for complete search history.

(56) References Cited

U.S. PATENT DOCUMENTS

| | | | |
|---|---|---|---|
| 6,665,715 B1 | 12/2003 | Houri | |
| 7,062,572 B1 | 6/2006 | Hampton | |
| 7,200,658 B2 | 4/2007 | Goeller et al. | |
| 7,296,088 B1 | 11/2007 | Padmanabhan et al. | |
| 7,424,472 B2 | 9/2008 | Wang et al. | |
| 7,937,336 B1 | 5/2011 | Maynard-Zhang et al. | |
| 8,275,656 B2 | 9/2012 | Cetin | |
| 8,407,226 B1 * | 3/2013 | Das et al. | 707/739 |
| 2003/0074471 A1 | 4/2003 | Anderson et al. | |
| 2005/0108213 A1 | 5/2005 | Riise et al. | |
| 2009/0119394 A1 | 5/2009 | Winkler | |
| 2010/0114946 A1 | 5/2010 | Kumar et al. | |
| 2011/0282988 A1 | 11/2011 | Wang et al. | |
| 2012/0158712 A1 | 6/2012 | Karanjkar et al. | |
| 2012/0166416 A1 | 6/2012 | Murdock et al. | |
| 2012/0317104 A1 | 12/2012 | Radlinski et al. | |
| 2013/0007256 A1 | 1/2013 | Prieditis | |
| 2013/0159254 A1 | 6/2013 | Chen et al. | |

OTHER PUBLICATIONS

U.S. Appl. No. 13/458,895, filed Apr. 27, 2012, Herring et al.
Blei et al., "Latent Dirichlet Allocation," *J. Machine Learning Research*, 2003, 3:993-1022.
Hofmann, "Probabilistic Latent Semantic Analysis," *Uncertainty in Artificial Intelligence*, Stockholm, 1999, 8 pages.

(Continued)

*Primary Examiner* — Jeffrey A Griffin
*Assistant Examiner* — Ola Olude Afolabi
(74) *Attorney, Agent, or Firm* — Fish & Richardson P.C.

(57) ABSTRACT

Methods, systems, and apparatus, including computer programs encoded on computer storage media, for determining geographic locations of devices. One of the methods includes obtaining an estimated user location associated with each respective IP address block based on observed events from the IP address block; obtaining an estimate of a probability model p(ev|loc), the probability model p(ev|loc) including a respective probability distribution of interest locations for each of multiple user locations; wherein obtaining the estimate of the probability model p(ev|loc) includes calculating p(ev|loc) from a p(zone|loc) matrix and a p(ev|zone) matrix; and using the estimate for the probability model p(ev|loc) and the observed events to calculate an estimate for multiple probability distributions X(loc) associated with a respective IP address block.

17 Claims, 2 Drawing Sheets

(56) References Cited

OTHER PUBLICATIONS

Teh et al., "Hierarchical Dirichlet Processes," *J. Amer. Statistical Assoc.*, 2006, 101(476):1566-1581.

Adams et al., "On the geo-indicativeness of non-georeferenced text," 2012, Proceedings of the Sixth International AAAI conference on Weblogs and Social Media, pp. 375-378.

Backstrom et al., "Spatial variation in search engine queries," 2008, Proceedings of the 17$^{th}$ international conference on World Wide Web, Apr. 2008, pp. 357-366.

Bennett et al., "Inferring and using location metadata to personalize web search," 2011, Proceedings of the 34th international ACM SIGIR conference on Research and development in Information Retrieval, Jul. 2011, pp. 135-144.

\* cited by examiner

REFINING LOCATION DETECTION FROM A QUERY STREAM

BACKGROUND

This specification relates to determining geographic locations of devices on a network.

Knowing the geographical location of a device coupled to a network, e.g., the Internet, can be valuable to provide new or improved services to the device or to users of the device. For instance, news, weather alerts, advertisements, and other services can be selected based on knowing where a user device is located.

SUMMARY

In general, one innovative aspect of the subject matter described in this specification can be embodied in methods that include the actions of obtaining an estimated user location associated with each respective IP address block of multiple IP address blocks based on observed events from the IP address block; obtaining an estimate of a probability model p(ev|loc) using the obtained estimated user locations, the probability model p(ev|loc) including a respective probability distribution of interest locations for each of multiple user locations, each value $p(ev_i|loc_j)$ of the probability model p(ev|loc) representing a respective probability that event queries issued from a user location $loc_j$ have an interest location $ev_i$; wherein obtaining the estimate of the probability model p(ev|loc) includes calculating p(ev|loc) from a p(zone|loc) matrix and a p(ev|zone) matrix; and using the estimate for the probability model p(ev|loc) and the observed events to calculate an estimate for multiple probability distributions X(loc), each probability distribution X(loc) being associated with a respective IP address block. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Calculating the p(zone|loc) matrix includes: establishing a specified number of zones; and for each user location, determining a count of the event queries whose interest locations are within each zone of the user location. Calculating the p(ev|zone) matrix includes: for each interest location, identifying a respective set of user locations that is within each zone of the interest location; determining a count of the event queries that were issued from the respective set of user locations in the zone; and determining a count of the event queries that were issued from the respective set of user locations in the zone and there were for the interest location. Calculating p(ev|loc) includes calculating the matrix product of p(ev|zone)×p(zone|loc). The method includes normalizing p(ev|loc) to generate a smoothed probability model. The smoothed probability is refined by adding a multiplier such that the probability model is based on p(ev|zone), p(zone|loc), and multiplier f(dist). The multiplier is a multiplier matrix. Using the estimate for the probability model p(ev|loc) and the observed events to calculate an estimate for a multiple probability distributions X(loc) includes: calculating the estimate for the probability distribution X(loc) using an iterative Expectation Maximization (EM) process until a current estimate of the probability distribution X(loc) converges according to a second predetermined threshold, the EM process includes: computing a probability model q(loc|ev) based on the current estimate of the probability distribution X(loc) according to a first equation $$q(loc/ev) = \frac{p(ev/loc) \cdot X(loc)}{\sum_{loc'} p(ev/loc') \cdot X(loc')};$$

and updating the current estimate of the probability distribution X(loc) according to a second equation $$x(loc) = \frac{1}{N} \sum_{i=1}^{N} q(loc/ev_i),$$

where $ev_1, ev_2, \ldots ev_N$, represents observed interest locations.

Particular embodiments of the subject matter described in this specification can be implemented so as to realize one or more of the following advantages. The techniques described in this specification can improve the accuracy of a geographical position estimate of a device on a network, in particular, of devices on the Internet. A probability model can be calculated from two matrices using zones, which reduces memory and processing costs. Additionally, statistical precision can be increased. Since there are fewer parameters to be estimated based on the same data, these parameters can be estimated with greater accuracy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A probability distribution X(loc) can be estimated for each of multiple IP address blocks. Each IP address in the IP address block is a numerical label associated with a particular user device, e.g., a computer. Each user device is also associated with one or more geographic locations. IP addresses are assigned to networks in different sized IP address blocks.

The probability distribution X(loc) for a particular IP address block indicates how likely that event queries (Q) received from IP addresses in that IP address block were issued from various user locations (loc). The event queries (Q) refer to queries obtained from a query log and that are directed to some location of interest (ev). For example, queries in the form "restaurant in New York" or queries seeking map directions with a particular starting location, e.g., a query seeking the location of Z on a map. A probability model p(ev|loc) is used to generate estimated probability distribution for each of multiple IP address blocks. Generating estimated probability distributions for each of multiple IP address blocks is described below with respect to FIG. 1.

Because event queries are not uniformly distributed, the estimated user locations can be inaccurate. Additionally, because of the large numbers of event queries and user locations, calculating the probability distribution from a probability model p(ev|loc), as described with respect to FIG. 1 can be cumbersome. In particular, the matrix for the probability model p(ev|loc) has N×M elements and hence takes up a O(N×M) space. Using a refinement for calculating p(ev|loc), this space can be reduced to order O(N+M), improving performance. This is a lot less, which is a benefit for the technical implementation of this algorithm. Additionally, the O(N+M) parameters are more likely to be determined by the available observed event data, which means that the results are more accurate. Calculating the probability values for the probability model p(ev|loc) can be refined using zones and by performing smoothing. Calculating the probability model using zones and by performing smoothing is described in greater detail below with respect to FIG. 2.

Figure 1:
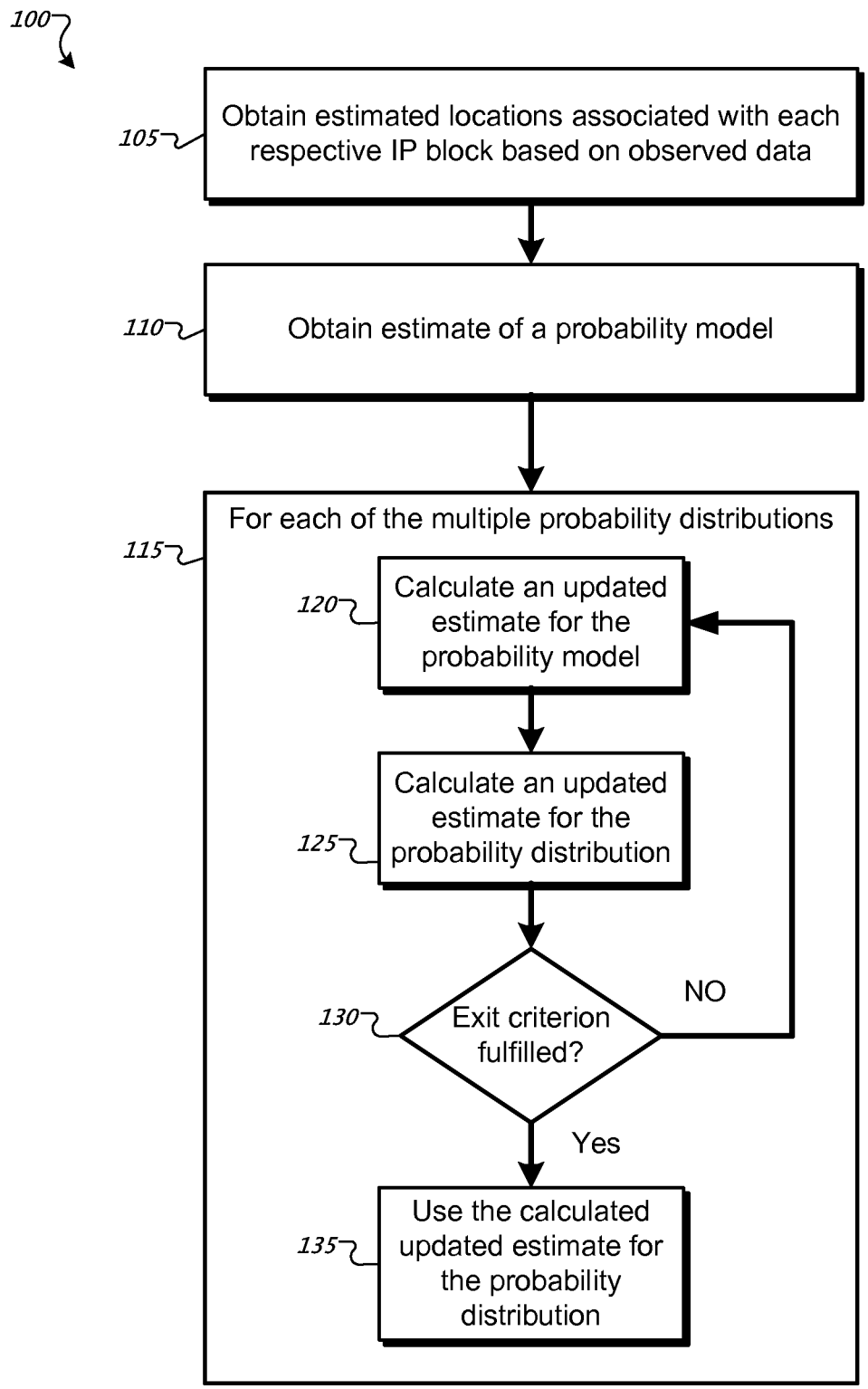
FIG. 1 is flowchart of an example method of obtaining an adjusted probability distribution for an internet protocol (IP) address block.

FIG. 1 is flowchart of an example method 100 of obtaining an adjusted probability distribution for an internet protocol (IP) address block. For convenience, the method 100 will be described with respect to a system having one or more computers that performs the method 100.

The system obtains (105) location estimates for each IP address block of a set of IP address blocks b based on observed data.

In particular, given a particular IP address block, the likelihood of a particular observed event from that particular block b, N(ev|b), can be determined from observed query data in a particular time span. Therefore, the location of the IP address block b can be estimated from the observed N(ev|b) if it is assumed that all users are in approximately the same location (loc) and the event locations are clustered around this loc.

Several techniques can be used to determine the location of each IP address block. In some implementations, the location is assigned to each IP address block by taking the "center" of the observed location of interest. In some alternative implementations, the initial estimate assigns a most likely user location, e.g., of a user device or a group of user devices, a probability of one and the remaining user locations are assigned the probability of zero. The most likely user location can be previously determined or determined using a different estimation scheme.

In some implementations, for each IP address block b, the interest locations of all event queries are identified and counted. The interest locations can be weighted by their respective query counts and used to obtain an average location. The average location is used as the estimated user location (loc) for that particular IP address block. Different IP address blocks can have a same average location.

Once each IP address block is associated with an estimated user location, the event queries associated with the same estimated user location, or within a threshold distance of the estimated user location, are collected into a respective set of event queries. Within each set of event queries, there are event queries associated with different IP address blocks. These event queries are also associated with different interest locations. Thus, there are M such different sets of event queries $\{Q\}_m$, each set associated with a respective user location $loc_m$.

From each set of event queries $\{Q\}_m$ the number of event queries for each interest location (ev) is counted. Based on these counts, the probability for each interest location $ev_n$ for the user location $loc_m$ is proportional to that count divided by the total count of event queries in the set $\{Q\}_m$.

The system obtains (110) an estimate for a probability model p(ev|loc). The probability model p(ev|loc) is an N×M matrix where N is the number of locations of interest, referred to as an interest location, that may be found in a collection of observed event queries, e.g., event queries may directly reference respective interest locations. In particular, the probability p(ev|loc) matrix can be derived from the initial user location estimates for the IP address blocks from the observed N(ev|b).

The values of a particular $p(ev_i|loc_j)$ represent the probability that event queries issued from $loc_j$ would have an interest location $ev_i$. For example, if a first interest location is Singapore, $ev_1$=Singapore, and a first location is Italy, $loc_1$=Italy, then a probability of $p(ev_1|loc)$=0.03 would indicate that out of the event queries issued from user locations in Italy, 3% contained an interest location of Singapore. The probability model p(ev|loc) represents the probability for all IP address blocks and not for any specific IP address blocks.

In some implementations, the set of potential locations is a constant although the actual observed locations, e.g., locations identified by event queries, may only be a small subset of the potential locations. Additionally, the actual observed locations may vary with time. Therefore, the matrix can be constructed such that only non-zero entities are included.

In some implementations, the probability model p(ev|loc) is estimated based on a filtered group of IP address blocks. The IP address blocks can be filtered, for example, based on an initial classifier that identifies IP address blocks that are localized around a particular location according to particular criteria. In some implementations, the filtering seeks to exclude IP address blocks where interest locations do not cluster around a unique center. Thus, the criteria can be, for example:

1. Use the IP address block if 80% of the interest locations are within a radius of 50 km around a location.
2. Use the IP address block if there is a location that appears that appears in 50% of all queries, and 60% of the remaining interest locations are within 100 km around this location.
3. Do not use the IP address block if there are two locations that are more than 50 km apart and each appears in more than 30% of the queries.

Additionally, IP address blocks may be further filtered based on their having a threshold number of associated queries.

Using the estimate for the probability model p(ev|loc), an N×M matrix, and the observed event counts N(ev|b), the system can calculate (115) an estimate for each of the respective probability distributions X(loc) each probability distribution X(loc) being associated with a respective IP address block. Each probability distribution X(loc) includes values $X(loc_m)$ representing a respective probability that users associated with the respective IP address block are located at a user location $loc_m$. Different techniques can be used to calculate estimates for each of the respective probability distributions X(loc). The Expectation Maximization (EM) process is described below.

Calculating the estimates for a particular probability distribution x(loc) associated with a corresponding IP address block, e.g., IP address block "A," can be performed using an iterative process of calculating (120) an updated estimate for a probability model q(loc|ev) for the particular IP address block and then using that probability model to calculate (125)

an updated estimate for the probability distribution x(loc) for the IP address block. The probability model q(loc|ev) indicates the probability that a user device is located in a geographical location (loc) given that an event query is observed.

The estimate for the probability model and the probability distribution are calculated using an iterative process. One example iterative process that can be used is the Expectation Maximization process. The EM process iterates between the E and M steps until the value for X(loc) converges according to a predetermined threshold requirement:

(E-step):

$$q(loc/ev) = \frac{p(ev/loc) \cdot x(loc)}{\sum_{loc'} p(ev/loc') \cdot x(loc')},$$

where x(loc) is a current estimate of the probability distribution for user locations for a given IP address block.

For example, for $loc_1$=Italy, and $ev_1$=Singapore, $q(loc_1|ev_1)$=0.3 represents a probability that out of queries having the interest location Singapore and coming from IP address block IPA, 30% come from users located in Italy.

(M-step): Once the system estimates q(loc|ev) for a given IP address block, the system obtains a new estimate for x(loc) based on the following relation, $$x(loc) \propto \sum_{i=1}^{N} q(loc/ev_i),$$

where $ev_1, ev_2, \ldots ev_N$ are the observed interest locations for the given IP address block.

Iterations between the E and M steps can be performed until the system determines (130) that an exit criterion has been fulfilled. This can include determining if the change in a last step is lower than a predetermined threshold, or that the change in a last number of steps was lower than a predetermined threshold. Other exit criteria can include a maximum number of iterations.

If it is determined that the exit criterion has not been fulfilled ("no" branch from 130), the E and M steps (120) and (125) are repeated.

This iteration can be continued until an exit criterion is fulfilled ("yes" branch from 130). This can include determining if the change in a last step is lower than a specified threshold value, or that the change in a last number of steps was lower than a specified threshold value. Other exit criteria can include a maximum number of iterations performed.

The then-current probability distribution can be used as an estimate for the probability distribution X(loc) of the geographical locations of the device or the group of devices (135). These probability distributions can be used to estimate geographic locations for particular devices.

In some implementations, a large number of the event queries are each observed from a single IP address block. As a result, for a particular IP address block from which such an event query is issued, the estimated user locations from which this event was issued would be the same as the initial estimate for the average location of the address block, e.g., using the initial classifier. The estimate would not be corrected by the iterative E and M steps described with respect to FIG. 1 because for such an event $ev_0$ and initial location estimate of the IP address block $loc_0$ the $p(ev_0|loc)$=0 if the loc does not equal $loc_0$. Therefore, the E and M process determines that there is a maximum certainty that the event was issued from $loc_0$ meaning that in the M step all such unique events contribute to a probability mass $x(loc_0)$ in the point $loc_0$ that was initially chosen.

Additionally, the number of event queries for each user location-interest location (loc-ev) pair is small. Statistically, these can be unstable due to the small size of the sample event queries.

Furthermore, the event locations and user locations can be numerous. As such, storing the probability matrix p(ev|loc), and doing the calculations can require large amounts of memory.

Therefore, instead of storing the matrix p(ev|loc) for all (ev-loc) pairs that are directly derived from the observed event queries, the probability values for the probability model p(ev|loc) can be calculated from two smaller matrices: p(zone|loc) and p(ev|zone). The number of zones can be a small integer, e.g., as small as six. The division between zones is based on the distance between each pair of event location and user location. As a result, less RAM is used to store and process the data.

Figure 2:
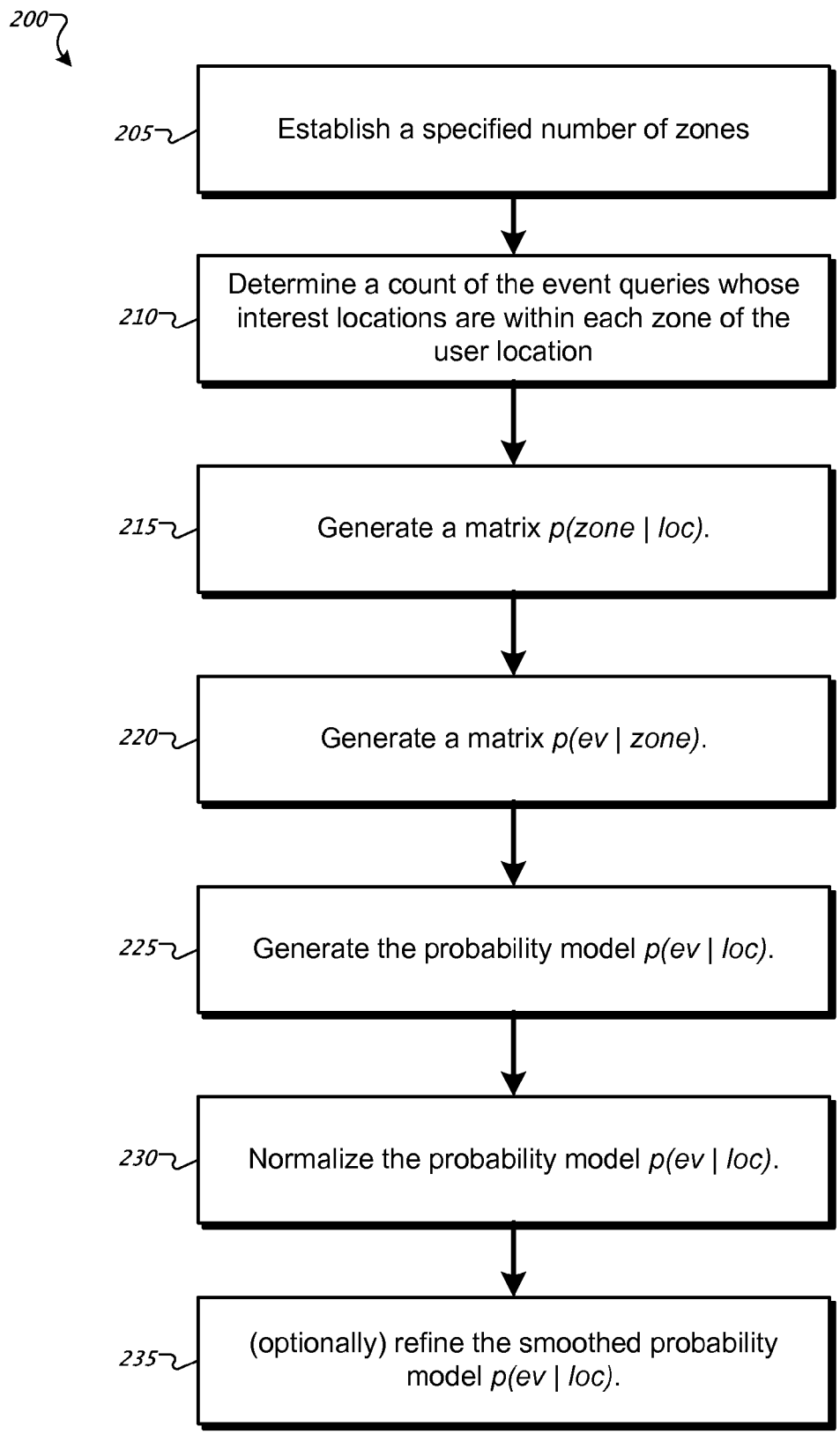
FIG. 2 is a flowchart of an example method for generating a probability model using zones.

FIG. 2 is a flowchart of an example method 200 for generating a probability model p(ev|loc) using zones. For convenience, the method 200 will be described with respect to a system having one or more computers that performs the method 200.

The system establishes (205) a specified number of zones, which can also be referred to as distance intervals. The zones define a distance range associating event queries and user locations such that an event query is located within a particular zone if the interest location of the event query is within the specified distance range of the user location. The number of zones can be a small integer value, e.g., six. For example:

(1) |ev-loc|=0-15 km;
(2) |ev-loc|=15-50 km;
(3) |ev-loc|=50-150 km;
(4) |ev-loc|=150-500 km;
(5) |ev-loc|=500-1500 km; and
(6) |ev-loc|>1500 km.

For each user location ($loc_i$), the system determines (210) a count of the event queries whose interest locations are within each zone of the user location ($loc_i$).

The system can identify the event queries for the user location ($loc_i$) using the event queries from each IP address block that have already been associated with a respective estimated user location, as described above. Therefore, the system can identify the event queries $\{Q\}_m$ that are associated with the same estimated user location. This set of event queries $\{Q\}_m$ can be used to determine the count of the event queries that fall within each zone of the user location $loc_m$.

Using the count of even queries having interest locations within each zone, the system generates (215) a matrix p(zone loc). In the example above with six zones, the matrix p(zone|loc) has dimensions M×6.

The system generates (220) a matrix p(ev|zone). For each interest location ($ev_j$), the system identifies a respective set of user locations that is within each zone of the interest location ($ev_j$). Then, for each $A_k$, the system determines a count of the queries that original from a location loc in $zone_k$ from ev, and have an interests location ev' that is in $zone_k$ from the loc and a count $B_k$ of the event queries that were issued from the respective set of user locations in the zone and that were for the interest location $ev_j$. The probability value $p(ev_j|zone_k)$= $B_k/A_k$. Thus, for all interest locations (ev) the resulting matrix p(ev|zone) is generated using the respective counts. Referring to the above example of six zones, the matrix p(ev|zone) has dimension 6×N.

The system generates (225) the probability model p(ev|loc). In particular, the probability model p(ev|loc) is based on the matrix product p(ev|zone)×p(zone|loc), which has dimension N×M. Because the "zone" in p(zone loc) corresponds to a different area than the "zone" in p(ev|zone), the system normalizes (230) the probability model p(ev|loc) so that the probabilities will sum to 1. Consequently, the normalized formula is:

$$p(ev|loc)=p(ev|zone) \times p(zone|loc)/Z(loc),$$

where $Z(loc)=\Sigma\{ev'\}p(ev'|zone') \times p(zone'|)$, and where zone' is the zone corresponding to the distance between ev' and loc.

This normalized p(ev|loc) is the so-called "smoothed" probability model p(ev|loc). The smoothed probability model p(ev|loc) can be used in place of the p(ev|loc) described in step 110 of FIG. 1. Thus, the smoothed probability model p(ev|loc) can be used to generate probability distributions X(loc) for each IP address block using the iterative process as described in FIG. 1.

The system optionally refines 235 the smoothed probability model p(ev|loc). In some alternative implementations, the smoothed probability model p(ev|loc) is refined by adding a multiplier such that the probability model is based on p(ev|zone), p(zone|loc), and another multiplier f(dist). The multiplier f(dist) is a function that is fitted to the overall data, or the data within each zone, such that the variation of location or query densities within each zone is modeled by the multiplier. An example of the function is:

$$f(dist)=1/(c+dist^2),$$

where dist is the distance between the user location and the interest location.

Consequently, the smoothed probably model p(ev|loc) can be calculated as:

$$p(ev|loc)=p(ev|zone) \times p(zone|loc) \times f(dist(ev,loc))/Z(loc),$$

where the value for f(dist(ev, loc)) varies for different (ev-loc) pairs in the matrix p(ev|loc), and Z(loc) is similar to the normalization factor above with the additional factor added, thus:

$$Z(loc)=\Sigma\{ev'\}p(ev'|zone') \times p(zone'|loc) \times f(dist(ev,loc)).$$

In some alternative implementations, the smoothed probability model p(ev|loc) is refined by introducing a multiplier matrix. The multiplier matrix can have dimensions C×C, where C is the number of countries or "cultural regions", which includes, for pairs of interest location and user location in the matrix that share the same language or other culture connections, a value that causes a boost in the corresponding probability value for the (ev-loc) pair in p(ev|loc). In some implementations, this multiplier can be used only for zones where the significance of dist does not vary much within the zone, e.g., zone 6 above where distance is greater than 1500 km.

The event query received from a user device can include, for example, a textual search query, a dictionary query, a map query, a rout query, an image query, an audio query, or a video query. In some implementations, other events can be used instead of or in addition to query events when location information can be directly or indirectly identified. Events are generally generated by a user device in response to a user action on the device; however, events may also be generated by the device itself. Events can be interactions of the user or the device with other devices or with resources or services on the network. Events can also be states or changes of state of the device itself that are transmitted to other devices on the network.

Events are described in this specification as being observed, collected, received, or obtained by the system, by which is meant that data representing each of the events is observed, collected, received, or obtained by the system, and that the data includes content of the event. Of particular interest are events that include implicit or explicit information related to the geographical location of the device from which the events originated.

Example systems and methods to obtain and store events from user devices are described in U.S. patent application Ser. No. 13/458,895, the contents of which are hereby incorporated by reference in their entirety.

An event can include viewport data, map coordinates, route information or any user selection of items shown on maps. An event can also include information derived from a user's selection from among search results received in response to a search query. An event can also include a URL or a sequence of URLs visited by a device. Moreover, an event can include web browser cookies or data received from a device, e.g., language settings, time zone settings or region settings. In addition, an event can include postings in a social network or a change of settings in a social network.

For situations in which the systems obtains personal information about users, or may make use of personal information, the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographical location may be generalized where location information is obtained, such as to a city, ZIP code, or state level, so that a particular location of a user cannot be determined. Thus, the user may have control over how information is collected about him or her and used by the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining an estimated user location of user devices associated with each respective internet protocol (IP) address block of a plurality of IP address blocks based on observed event queries from users associated with particular IP addresses of the IP address block;
obtaining an estimate of a probability model p(ev|loc) using the obtained estimated user locations, the probability model p(ev|loc) including a respective probability distribution of interest locations for each of a plurality of user locations, each value $p(ev_i|loc_j)$ of the probability model p(ev|loc) representing a respective probability that event queries issued from a particular user location $loc_j$ contain a particular interest location $ev_i$; wherein obtaining the estimate of the probability model p(ev|loc) includes calculating p(ev|loc) from a p(zone|loc) matrix and a p(ev|zone) matrix;
using the estimate for the probability model p(ev|loc) and the observed event queries to calculate an estimate for a plurality of probability distributions X(loc), each probability distribution X(loc) being associated with a respective IP address block and indicating a likelihood that event queries obtained from IP addresses of the respective IP address block were issued from user locations (loc); and
using the probability distribution X(loc) to estimate geographic locations for particular user devices.

2. The method of claim 1, wherein calculating the p(zone|loc) matrix comprises:
establishing a specified number of zones, wherein each zone specifies a distance interval associating event queries and user locations; and
for each user location, determining a count of the event queries whose interest locations are within each zone of the user location.

3. The method of claim 1, wherein calculating the p(ev|zone) matrix comprises:
for each interest location, identifying a respective set of user locations that is within each zone of the interest location;
determining a count of the event queries that were issued from the respective set of user locations in the zone; and
determining a count of the event queries that were issued from the respective set of user locations in the zone and there were for the interest location.

4. The method of claim 1, wherein calculating p(ev|loc) includes calculating the matrix product of p(ev|zone)×p(zone|loc).

5. The method of claim 1, comprising normalizing p(ev|loc) to generate a smoothed probability model.

6. The method of claim 1, wherein the smoothed probability is refined by adding a multiplier such that the probability model is based on p(ev|zone), p (zone|loc), and multiplier f(dist).

7. The method of claim 6, wherein the multiplier is a multiplier matrix.

8. The method of claim 1, where using the estimate for the probability model p(ev|loc) and the observed events to calculate an estimate for a plurality of probability distributions X(loc) comprises:
calculating the estimate for the probability distribution X(loc) using an iterative Expectation Maximization (EM) process until a current estimate of the probability distribution X(loc) converges according to a second predetermined threshold, the EM process comprising:
computing a probability model q(loc|ev) based on the current estimate of the probability distribution X(loc) according to a first equation $$q(loc/ev) = \frac{p(ev/loc) \cdot X(loc)}{\sum_{loc'} p(ev/loc') \cdot X(loc')};$$

and
updating the current estimate of the probability distribution X(loc) according to a second equation $$x(loc) \propto \sum_{i=1}^{N} q(loc/ev_i),$$

where $ev_1, ev_2, \ldots ev_N$, represents observed interest locations.

9. A system comprising:
one or more computers configured to perform operations comprising:
obtaining an estimated user location of user devices associated with each respective internet protocol (IP) address block of a plurality of IP address blocks based on observed event queries from users associated with particular IP addresses of the IP address block;
obtaining an estimate of a probability model p(ev|loc) using the obtained estimated user locations, the probability model p(ev|loc) including a respective probability distribution of interest locations for each of a plurality of user locations, each value $p(ev_i|loc_j)$ of the probability model p(ev|loc) representing a respective probability that event queries issued from a particular user location $loc_j$ contain a particular interest location $ev_i$; wherein obtaining the estimate of the probability model p(ev|loc) includes calculating p(ev|loc) from a p(zone|loc) matrix and a p(ev|zone) matrix;
using the estimate for the probability model p(ev|loc) and the observed event queries to calculate an estimate for a plurality of probability distributions X(loc), each probability distribution X(loc) being associated with a respective IP address block and indicating a likelihood that event queries obtained from IP addresses of the respective IP address block were issued from user locations (loc); and
using the probability distribution X(loc) to estimate geographic locations for particular user devices.

10. The system of claim 9, wherein calculating the p(zone|loc) matrix comprises:
establishing a specified number of zones, wherein each zone specifies a distance interval associating event queries and user locations; and
for each user location, determining a count of the event queries whose interest locations are within each zone of the user location.

11. The system of claim 9, wherein calculating the p(ev|zone) matrix comprises:
for each interest location, identifying a respective set of user locations that is within each zone of the interest location;
determining a count of the event queries that were issued from the respective set of user locations in the zone; and determining a count of the event queries that were issued from the respective set of user locations in the zone and there were for the interest location.

12. The system of claim 9, wherein calculating p(ev|loc) includes calculating the matrix product of p(ev|zone)×p(zone|loc).

13. The system of claim 9, comprising normalizing p(ev|loc) to generate a smoothed probability model.

14. The system of claim 9, wherein the smoothed probability is refined by adding a multiplier such that the probability model is based on p(ev|zone), p (zone|loc), and multiplier f(dist).

15. The system of claim 14, wherein the multiplier is a multiplier matrix.

16. The system of claim 9, where using the estimate for the probability model p(ev|loc) and the observed events to calculate an estimate for a plurality of probability distributions X(loc) comprises:

calculating the estimate for the probability distribution X(loc) using an iterative Expectation Maximization (EM) process until a current estimate of the probability distribution X(loc) converges according to a second predetermined threshold, the EM process comprising:

computing a probability model q(loc|ev) based on the current estimate of the probability distribution X(loc) according to a first equation $$q(loc/ev) = \frac{p(ev/loc) \cdot X(loc)}{\sum_{loc'} p(ev/loc') \cdot X(loc')};$$

and updating the current estimate of the probability distribution X(loc) according to a second equation $$x(loc) \propto \sum_{i=1}^{N} q(loc/ev_i),$$

where $ev_1, ev_2, \ldots ev_N$, represents observed interest locations.

17. A computer storage medium encoded with a computer program, the program comprising instructions that when executed by one or more computers cause the one or more computers to perform operations comprising:

obtaining an estimated user location of user devices associated with each respective internet protocol (IP) address block of a plurality of IP address blocks based on observed event queries from users associated with particular IP addresses of the IP address block;

obtaining an estimate of a probability model p(ev|loc) using the obtained estimated user locations, the probability model p(ev|loc) including a respective probability distribution of interest locations for each of a plurality of user locations, each value $p(ev_i|loc_j)$ of the probability model p(ev|loc) representing a respective probability that event queries issued from a particular user location $loc_j$ contain a particular interest location $ev_i$; wherein obtaining the estimate of the probability model p(ev|loc) includes calculating p(ev|loc) from a p(zone|loc) matrix and a p(ev|zone) matrix;

using the estimate for the probability model p(ev|loc) and the observed event queries to calculate an estimate for a plurality of probability distributions X(loc), each probability distribution X(loc) being associated with a respective IP address block and indicating a likelihood that event queries obtained from IP addresses of the respective IP address block were issued from user locations (loc); and using the probability distribution X(loc) to estimate geographic locations for particular user devices.

* * * * *